May 25, 1971   G. E. DYAL   3,580,770
METHOD FOR PRODUCING LAMINATED STRUCTURES
Filed Jan. 31, 1967   7 Sheets-Sheet 1
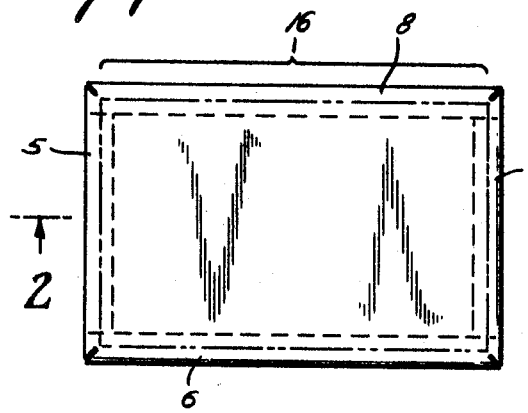
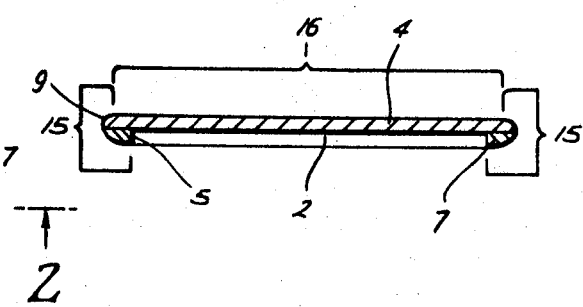
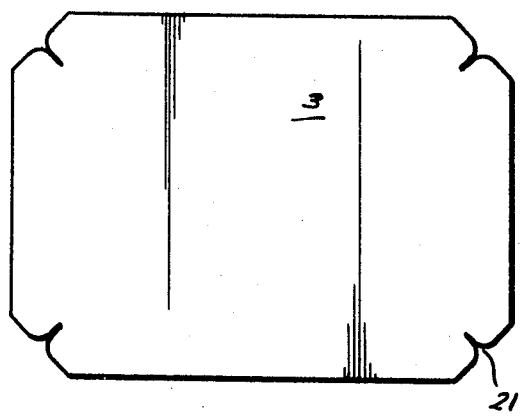
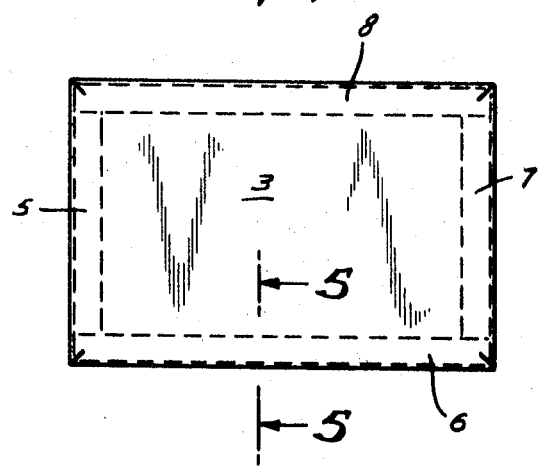
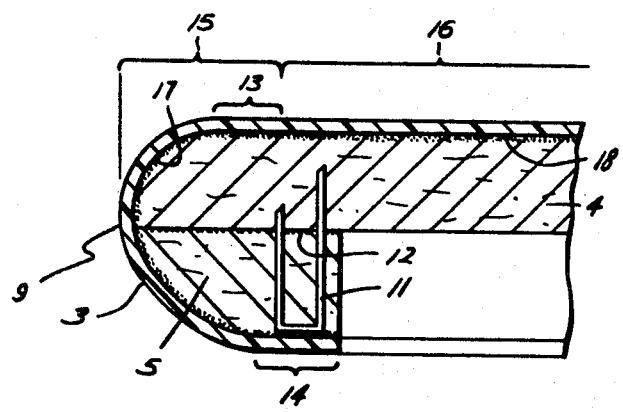
Gilford E. Dyal
INVENTOR.
BY Arnold and Roylance
ATTORNEYS

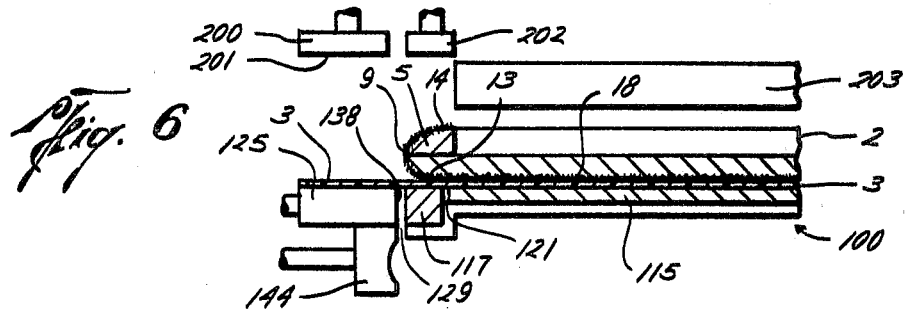
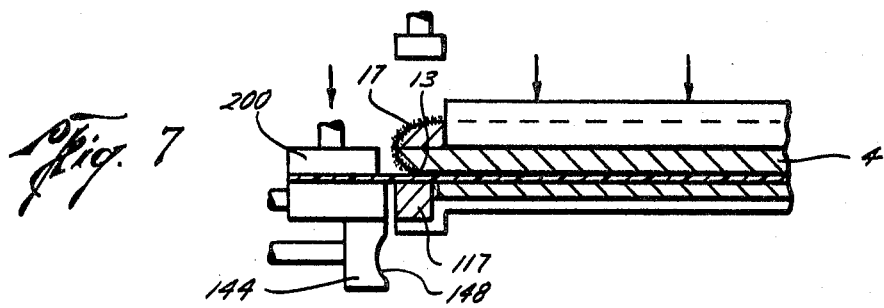
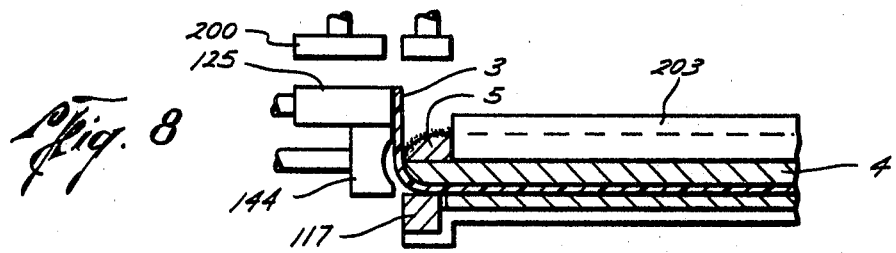
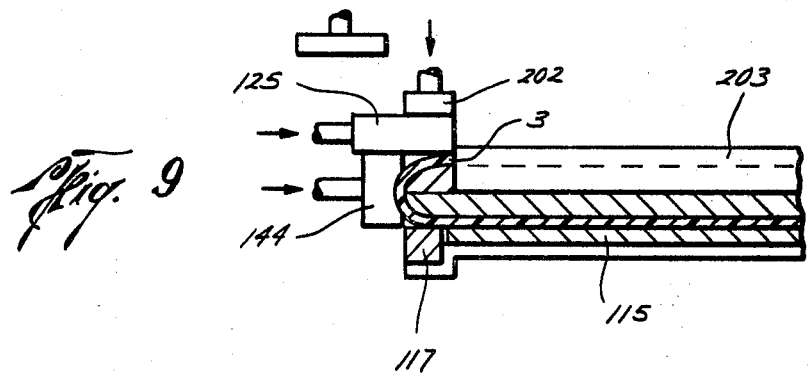

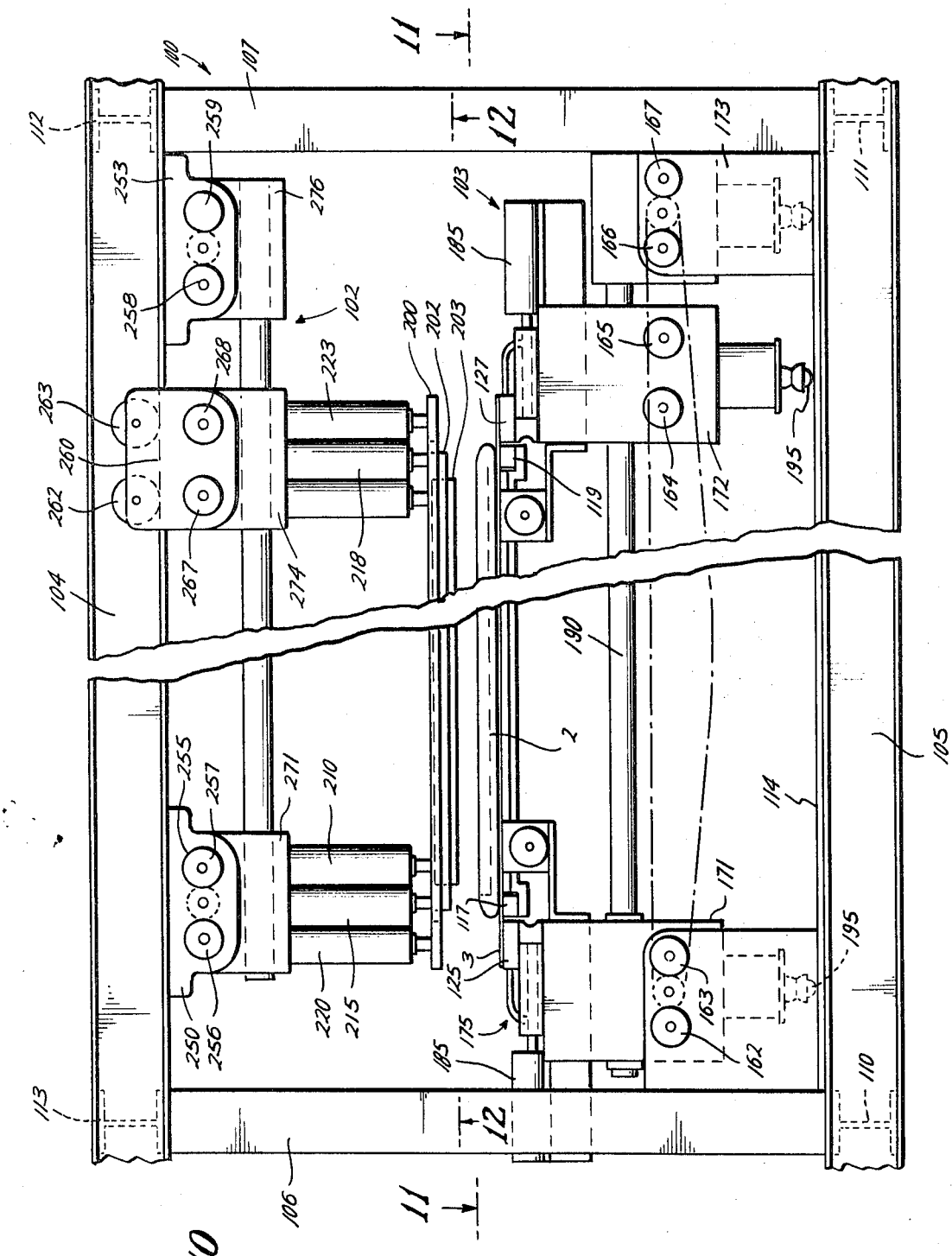

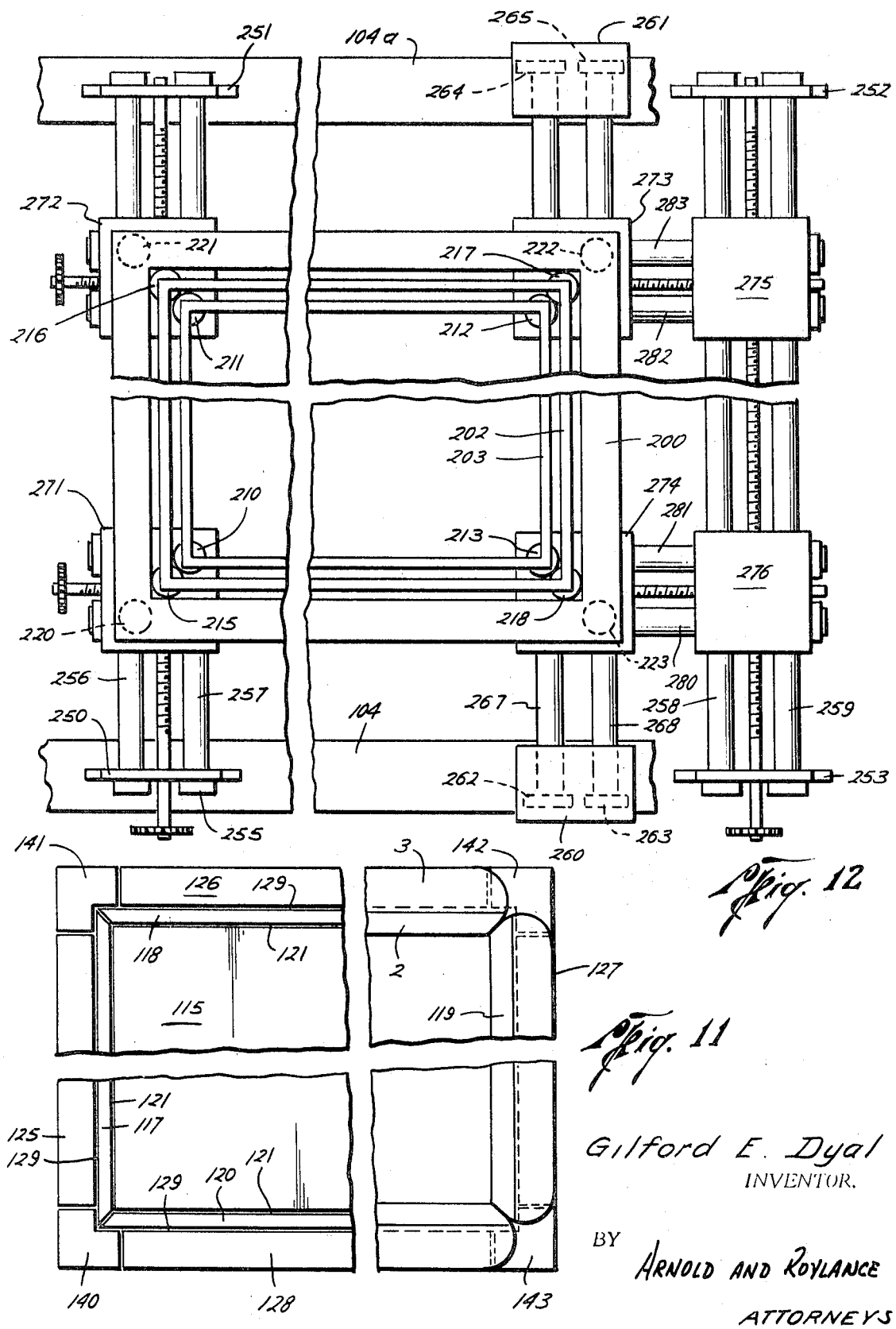

Gilford E. Dyal
INVENTOR.

BY Arnold and Roylance
ATTORNEYS

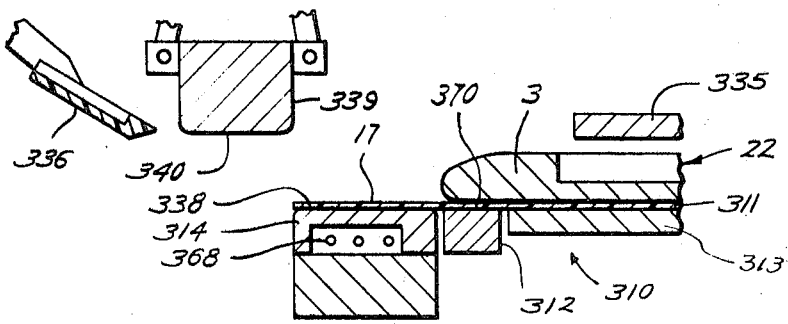
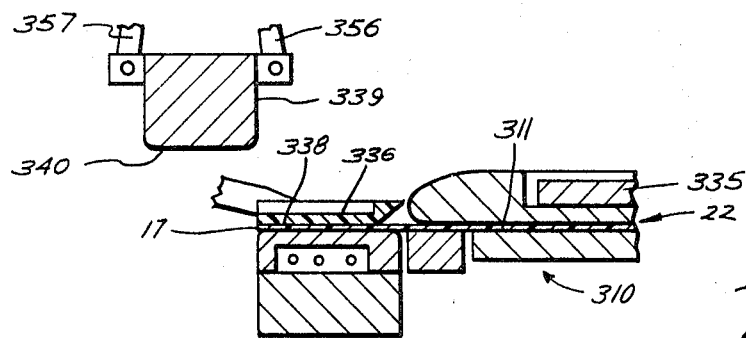
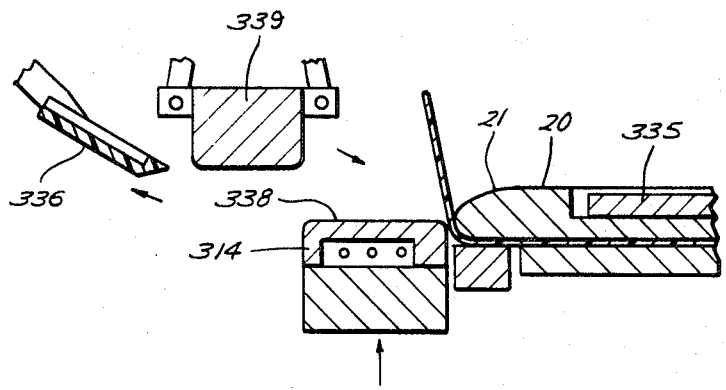
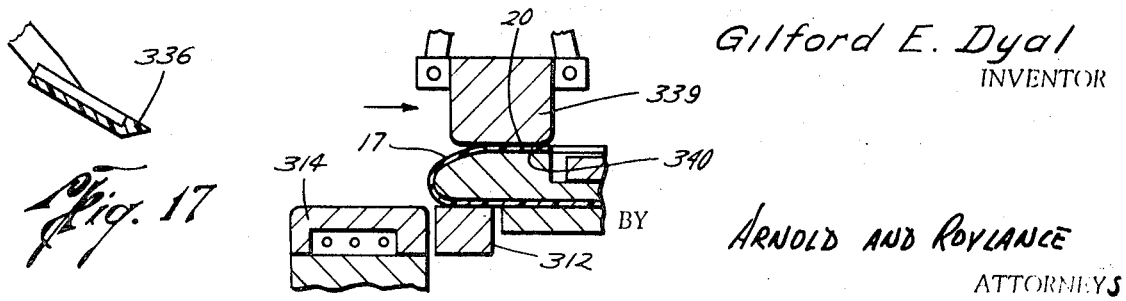

May 25, 1971 G. E. DYAL 3,580,770
METHOD FOR PRODUCING LAMINATED STRUCTURES
Filed Jan. 31, 1967 7 Sheets-Sheet 7

Gilford E. Dyal
INVENTOR.
BY
Arnold and Roylance
ATTORNEYS

United States Patent Office 3,580,770
Patented May 25, 1971

3,580,770
METHOD FOR PRODUCING LAMINATED
STRUCTURES
Gilford E. Dyal, San Antonio, Tex., assignor to
Tripro, Inc., San Antonio, Tex.
Filed Jan. 31, 1967, Ser. No. 612,938
Int. Cl. B32b 3/04
U.S. Cl. 156—216
14 Claims

ABSTRACT OF THE DISCLOSURE

Postforming facing sheets such as the C-stage laminates are bonded to and around the returning peripheral edges of a planar polygonal core by a process involving heating only the peripheral outer portions of the sheet and bonding the outer portions of the sheet to the core with a heat activated adhesive while the main portion of the sheet is bonded to the core by a contact adhesive.

The apparatus for this method has a support surface surrounded by two sets of heating bars which heat only the outer portions of the sheet with the outer set of heating bars being movable relative to the core to wipe the sheet around the core after the sheet is heated to postforming temperature by the heater bars. The apparatus has a lower mechanism comprising the support and heaters and an upper mechanism having elements which exert downward pressure to enable positioning heating and bending of the sheet to the core.

CROSS REFERENCES TO RELATED APPLICATIONS

This application is related to application Ser. No. 612,939, now abandoned entitled "Laminate Construction," filed concurrently with the instant application in the name of Gilford E. Dyal as inventor.

BACKGROUND OF INVENTION

This invention relates to a novel method and apparatus for producing laminate structures wherein a facing sheet is bonded to a core. More specifically, the instant invention provides a novel method and apparatus for producing laminate structures wherein an integral sheet of a postforming high pressure laminate material is bonded to and around the returning edges of a core to produce decorative and functional panels.

Laminating sheet materials formed of laminated resin and cloth or paper, and typified by those materials sold under the trademark "Formica" and "Micarta" have long been recognized as finding application for providing mar-resistant surfaces in bar and counter tops and the like. Improvements in these materials which now enable realistic simulation of wood with such stain and burn resistant facing sheets have opened greater markets for these materials in the fields of household and commercial furniture.

These materials, generally characterized as C-stage plastic materials comprise laminated sheets such as, for example, paper, fabric, or woven glass fibers impregnated with a suitable thermosetting resin such as phenol urea melamine formaldehyde resins and their derivatives including the group of various unsaturated polyester resins. These C-stage plastic laminates cannot be bent to conform to a curved substrate or core without the application of heat. Furthermore, once formed, the plastic is thermoset in position precluding any further bending and forming of the sheet in that region. Accordingly, in the art, when it has been desired to utilize these materials for facing sheets, the sheet has been preformed to the shape of the substrate or core and subsequently bonded to the core.

In addition to the obvious disadvantages to such a two step operation, it can be appreciated that such a preforming operation would be ineffective to preform a C-stage laminating sheet to completely cover and return under all the edges of, for example, a rectangular or square tabletop.

Another approach to utilizing these materials in furniture application has been to apply the laminate piecemeal and to cover, for example, the tabletop with a large facing sheet, and to cover the right-angle edge portions of the tabletops with separate narrow strips to produce as near to a feathered edge as possible. However, the expansion and contraction of the facing sheet and the core to which it is bonded in response to changes in temperature and humidity too often result in openings between the abutting faces of the facing sheet at the corners. Moreover, the wear and tear to which furniture is naturally subjected which effects primarily the edges of the piece also contribute to a separation of abutting facing sheets, particularly at corners.

A further desirable characteristic in furniture is "balanced construction." The different rates of expansion and contraction of the core and the facing sheet in response to changes in temperature and humidity very often results in warping of the laminate or bubbling of the facing sheet away from the panel. Balance in laminate structures is most often obtained by providing backing sheets on the opposite side of the core to exactly offset the longitudinal shrinking with swelling of the laminate or facing sheet. The ideal backing sheet not only responds to moisture change just as does the laminate, but also transmits as much stress to the core as does the laminate. Of course, it can be readily appreciated that the expense of providing backing sheets on all cores makes such a procedure undesirable.

SUMMARY OF INVENTION

Accordingly, it has been found that the novel method and apparatus of this invention at once solves several difficulties which have beset the laminating art. Initially, the instance novel process provides a method for bonding an integral facing sheet to and around the edges of a polygonal core that eliminates the need for preforming the laminate, provides a method for covering and turning the edges of a panel with an integral sheet of laminate, and also enables production of a laminate which exhibits many of the qualities in resistance to warp which has heretofore been found only in balanced construction.

It is accordingly an object of this invention to provide a method and apparatus for producing laminate structures wherein a postforming sheet is bonded to and around the edges of a polygonal core.

It is a further object of this invention to provide a method to produce a laminate structure using postforming facing sheets, which structures exhibit the desirable warp-resistant qualities of balanced construction.

It is yet a further object of this invention to provide a method and apparatus to simultaneously form a postforming facing sheet around all or any number of the edges of a polygonal core.

It is a further object of this invention to provide a novel method and apparatus for producing laminate structures wherein heat is applied to only selected portions of the structure to minimize swelling or shrinking of the components of the structure during the forming process itself.

In satisfaction of these objects, there is provided by the instant invention the method wherein the peripheral edge portions only of a postforming facing sheet are heated and formed around all the sides of a polygonal core simultaneously, such that the sheet covers one planar face of the core and returns around the peripheral edge portions. The facing sheet is then bonded to the peripheral edge portions of the core by a thermally activated adhesive, preferably a thermosetting adhesive.

It will be appreciated by those skilled in the art that the instant novel process may be employed to postform a facing sheet around any number of edges of a core. However, the advantages of this novel process are best appreciated in a process for wrapping and forming a postforming sheet around all edges of a polygonal core.

In the second aspect, there is provided by the instant invention an apparatus for postforming the facing sheet around the core in this manner wherein means are provided to selectively heat only the peripheral portions of the facing sheet and then heated forming means movable about the core postform the facing sheet about the core.

BRIEF DESCRIPTION OF DRAWINGS

The instant novel method and apparatus will be more particularly understood with reference to those specific embodiments illustrated in the accompanying drawings.

FIG. 1 is a top plan view of a typical rectangular core which may be employed to produce laminate structures employing the novel method and apparatus of this invention.

FIG. 2 is a cross-sectional view of the core of FIG. 1 along line 2—2.

FIG. 3 is a plan view of a properly configured facing sheet adapted to cover and turn the edges of the core illustrated in FIGS. 1 and 2.

FIG. 4 is a plan view of a laminate structure produced using the novel method and apparatus of this invention showing a face sheet bonded to cover and turn the edges of a polygonal core.

FIG. 5 is a cross section of a peripheral portion of the structure shown in FIG. 4 taken along the line 5—5 and giving the detail of the edge construction.

FIGS. 6 through 9 are schematic illustrations showing the novel method for producing laminate structures in accordance with this invention employing one embodiment of the novel apparatus of this invention.

FIG. 10 is an elevational view of a first embodiment of the novel apparatus of this invention with a facing sheet and core positioned thereon.

FIG. 11 is a sectional view taken along line 11—11 of FIG. 10 to show the outline and arrangement of the support surface and the heating and bending bars with respect to the facing sheet and the core.

FIG. 12 is a sectional view taken along line 12—12 of FIG. 10 to show the arrangement of the overhead pressure bars of the apparatus.

FIGS. 14 through 17 are schematic illustrations showing the novel method of this invention as performed by a second embodiment of the novel apparatus herein disclosed.

DESCRIPTION OF PREFERRED EMBODIMENTS

The novel method of the invention

Figure 13:
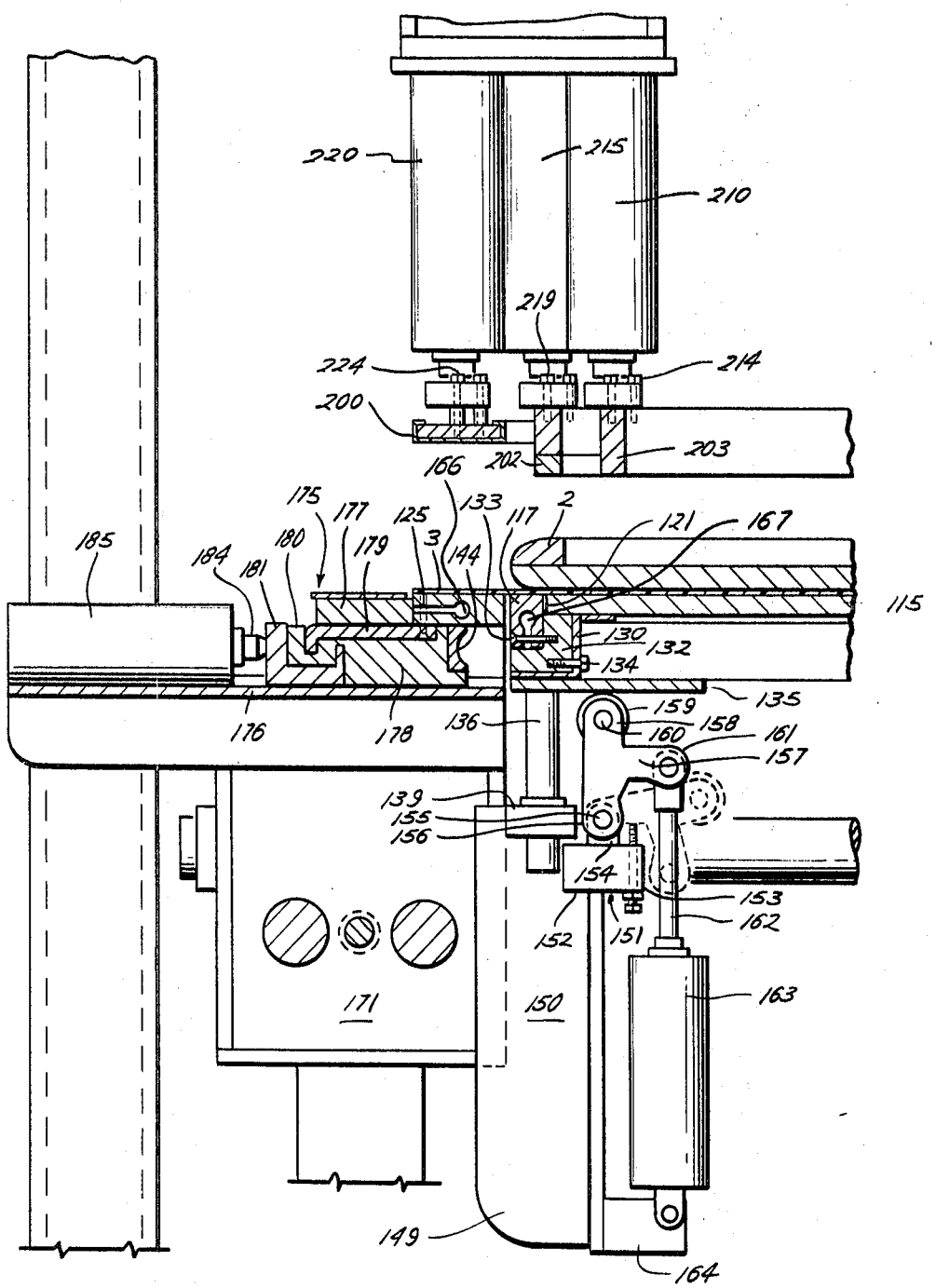
FIG. 13 is an enlarged elevation in partial section of the apparatus illustrated in FIG. 10.

Referring now more specifically to the drawings, FIGS. 1 and 2 show a typical, rectangular core having rounded returning peripheral edges which may be employed in making laminate structures employing the novel method and apparatus set forth herein. The core 2 illustrated is comprised of a flat panel sheet 4 provided with reinforcing strips 5, 6, 7, and 8 which are rounded to provide a peripheral portion defining the smooth curve extending from the planar face or panel 4 to the lower face of the reinforcing strips. The curved edge portion 9 of the core should be such that the curved edge does not at any point present a curved surface which has a radius of curvature less than the minimum radius of curvature around which the facing sheet may be formed. It is pointed out that the core as illustrated is of particle board material but that any suitable material, for example, wood, honeycomb, metal, or the like may be employed for this invention. A nongrain material is preferred since grain causes variation in expansion and contraction of a single core in the grain and cross-grain directions. In all instances, it is preferred, however, to suitably form the peripheral edge portion by milling or the like to provide a curve which does not exceed the limits of the facing sheet to be used.

FIG. 3 is a plan view showing a facing sheet which is properly configured at the corner portion 21 to conform to the corners of core 2. The facing sheet illustrated is a postforming material such as the C-stage laminating material discussed above. The corner configuration of the facing sheet actually corresponds to a double development of the corner of the core such that when the facing sheet is wrapped around the polygonal core, the facing sheet essentially covers the entire corner and leaves only a small slit running along the corner or vertex of the core.

It is pointed out that the novel method and apparatus of this invention is adapted to form the facing sheet around the edges of the core so as to return inwardly with respect to the major planar face of the core. Thus, the novel method and apparatus of this invention is singularly adapted to produce structures wherein the facing material extends around the core to a point greater than 90° from the major planar face of the core. Of course, the novel method and apparatus of this invention may be employed to produce drop-edge laminar structures, i.e., wherein the facing sheet is merely dropped off a curved peripheral portion of the core to a point at right angles with the major planar face of the core. However, such structures, although desirable in many applications and utilizing the principles of the instant invention, do not fully exploit the advantages available according to the instant invention.

The detail of construction of the laminate structures produced by this invention is more specifically shown in FIGS. 4 and 5 which illustrate a completed laminate structure. Referring specifically to FIG. 5, facing sheet 3 covers the planar portion of core 2 and is bent around the returning peripheral portion of the core which is constructed from panel 4 and reinforcing strip 5 to provide an outer curved edge. Staple 11 and cement 12 serve to bond the reinforcing strip to panel 4 and are illustrative of how this bonding may be accomplished.

In accordance with the novel method of this invention, the facing strip 3 is bonded to the core employing a thermally activated adhesive in the region extending from 13 around the edge to the region designated 14 around the returning curved edge 9. Preferably, a thermosetting heat hardening adhesive is employed for this. On the other other hand, in region 16, the facing sheet is bonded to the core using a suitable type of contact adhesive which does not require thermal activation to produce bonding.

A more detailed description of the laminates produced in accordance with the novel method and apparatus of this invention are more precisely described in copending patent application Ser. No. 612,939, now abandoned, filed concurrently with the instant application and further identified in the first paragraph of this specification.

In accordance with the novel method of this invention, a polygonal core having properly rounded edges defining a curve which does not exceed the minimum radius of curvature of the facing material to be used is properly registered with the facing sheet such that the cutout corners of the facing sheet and the corners of the core are in proper overlying relationship. It is extremely important that this indexing between sheet and core be carried out accurately, preferably to insure no more than five thousandths of an inch tolerance in positioning the core relative to the facing sheet. Of course, it can be appreciated that if the corner portions of the core and the cutout portions of the facing sheet are misaligned that the finished appearance of the ultimate laminate structure, particularly in the region of the corners, will suffer. Misalignment also results in cracking of the facing sheet in many instances.

The registering operation may be accomplished by providing indexing jigs in which both the facing sheet and the core may be set with the core resting on the facing sheet. The indexing should be carried out using mechanical means of some type, inasmuch as it has been found that indexing by eye alone is often not reliable.

During the indexing operation, the interior portion of the sheet is bonded to the planar face of the core by means of a contact adhesive. This, of course, necessitates a prior preparation of the interior portion of the core indicated at 16 in FIGS. 1 and 2 with this contact adhesive.

It should be mentioned that in all cases where laminate structures are constructed, it is desirable to let both the sheet and the core come to equilibrium under conditions of normal temperature and humidity prior to assembly. For example, it is advisable to maintain the sheet and core at about 70° to 80° and about 45% relative humidity. This insures that the sheet and the core upon bonding are at equilibrium under virtually the same conditions, and consequently will not build up opposing stresses immediately as these materials adjust to surrounding conditions.

Preparation of the core with adhesive materials is preferably accomplished prior to registering the core with the sheet. Initially, an adhesive which is thermally activatable is applied around the edge portion 15 of the core. The adhesive is then permitted to air dry, for as long as about seven days, such that it is no longer tacky to the touch but is capable of being activated upon application of heat. Preferably, a heat hardening thermosetting adhesive is employed in the outer portion of the core such that once thermally activated and bonded to the sheet, the adhesive thermosets in position and will not soften in response to subsequent exposure to heat. Suitable resins include the phenolic thermosetting resins and the like.

Following the depositing of the thermally activated resin around the edge portion 15 of the core, a contact adhesive is applied to region 16 of the core. In practice, it has been found possible to utilize thermosetting resins which, immediately after application, are good contact bonding adhesives, thus enabling the use of a single material as an adhesive to the entire sheet. In such case, of course, the outer portion of the adhesive material is applied first and permitted to dry. Then the additional adhesive is applied to the interior portion and this region is bonded to the facing sheet while the adhesive is still in a tacky condition. The use of one adhesive eliminates any problem which might occur by overlapping adhesives and also, despite the fact that the adhesives are thermally set in the edge portion and not in the interior planar portion, the use of one adhesive appears to minimize stresses in the ultimate laminate structure by virtue of different rates of expansion of the bonding material.

Accordingly, in the practice of the instant novel process, the rigid core, be it of metal, particle board, honeycomb, or like material, is registered on the sheet and at once pressure bonded to the sheet. This can be effected merely by placing the core topside down onto the sheet on a flat surface in registered position and then exerting pressure downwardly on the core against the sheet. When the core is centered on the sheet, the marginal portions of the sheet which ultimately will wrap around the returning edges of the core extend outwardly beyond the core on those sides of the core which are ultimately to be covered. Inasmuch as the core is already bonded to the sheet in this position, the sheet-core assembly may subsequently be handled without likelihood of upsetting the position of the core with respect to the sheet.

In this position, the outer portions of the sheet are then heated, preferably from the face or finished side of the sheet. This insures uniform liquification of the resin in the finished side of the sheet. Those portions of the sheet which are heated include the portions extending beyond the outer limits of the core as well as a marginal portion around the periphery of the planar portion of the core identified as region 15. Heating is preferably carried out by means of heated bars having flat surfaces against which the sheet-core assembly and the outer sheet material may be pressed. Other heating methods may be used, although it is pointed out that heating by infrared lamps or the like makes it difficult to restrict the heat to the marginal portions of the sheet, and hence is not preferred in the instant novel process. Inasmuch as the heat transfer through most C-stage high pressure laminates is very poor, it is preferred that positive heat transferring contact be made. Hence the sheet should not be made merely to rest on these heated bars but preferably pressed against such heated bars. In a particularly preferred method, the outer portions of the sheet extending beyond the core are pressed down against the heater bar by means of a resilient surface, such as of silicone rubber, to allow for any irregularities in the sheet and to insure proper heat transfer to all portions of the sheet.

The temperature and time of this heating operation is, of course, dependent on the precise facing material being employed and the thickness of the facing material. Generally, the facing materials employed are from .035 to .050 inch in thickness. Heating is carried out by pressing the sheet against a bar heated to 350° F. for about 35 to 45 seconds. This is generally sufficient to heat a sheet of C-stage laminating material to a temperature of from about 290° to 300° at which the sheet becomes formable by virtue of the phenolic resin in the sheet liquifying.

Following heating of the peripheral portion of the sheet including those portions extending beyond the core and those portions overlying the marginal planar portions of the core, all those portions of the sheet to be wrapped around the core are bent quickly upwardly then inwardly around the core. The residual heat in the sheet is sufficient to activate the thermosetting resin in the edge portion 15 of the core and to bond the sheet to the core, although positive heating of the edge portion may be continued. This bending operation may be effected by means of bars which are heated and which are moved with respect to the core to wipe the sheet material about the peripheral portion of the core. For example, bars outlining the core are moved perpendicularly upward with respect to the core and then inwardly over the returning peripheral portions of the core. Thereafter, pressure is maintained on the outer peripheral portion of the sheet against the core to permit setting of the bond in this region.

The instant novel process is schematically illustrated in FIGS. 6 through 9 and again in FIGS. 14 through 17. Each of these sets of figures illustrates effecting of the instant novel process using different forming machines. In each instance, only the portions of the sheet overlying the marginal planar surface of the core and extending beyond the core prior to bending, are heated. Soon after the heating operation is accomplished, bending members which extend substantially all along those portions of the sheet to be bended move the sheet under tension around the core and are adapted to hold the sheet around the core until the peripheral thermally activated bonding material sets to form a bond.

Novel method illustrated on one embodiment of apparatus

The instant novel process, as well as the novel apparatus of this invention which will be discussed hereinafter will better be understood by discussion of the forming of a laminate structure on the apparatus of FIGS. 10–13. This forming operation is illustrated schematically in FIGS. 6–9.

Inasmuch as FIGS. 6–9 are schematic illustrations showing only a portion of the apparatus, the entirety of the novel forming machines of this invention will not be discussed in relation to the figures but will be discussed hereinafter.

The apparatus of FIGS. 10 through 13 can be best explained by first discussing the operation of the apparatus in making laminated structures as illustrated schematically in FIGS. 6–9.

Thus with reference now to FIGS. 6 through 9, there is shown a facing sheet 3 registered below a core 2 composed of panel 4 and reinforcing strip 5, the core having an outer curved edge portion 9. Initially, core 2, the planer portion of which is preferably already bonded to facing sheet 3 in registered relation using, for example, a contact bonding material 18, is placed on bending mechanism 100 with the facing sheet downwardly resting on sole plate 115. The sole plate 115 has a polygonal outline substantially identical to the outline of core 2, through sole plate 115 is slightly smaller in all dimensions than the core. Immediately outwardly of the sole plate is a peripheral heating bar 117 on which rests the peripheral planar portion of core 2, which peripheral planar portion is indicated by 13, and is a planar portion of the core inward of the curved edge 9. In viewing the entire mechanism, it will be found that peripheral heating bars completely circumscribes the sole plate 115 to support and heat the peripheral planar portion 13 of the core 2 generally to an extent of one-half to one inch inwardly of the curved portion 9. Beyond the peripheral heating bar 117 is a bending and heating bar 125. Again only one of heating and bending bars is shown in FIGS. 13 through 16. The heating and bending bar has a flat surface which is coplanar with the surface of sole plate 115 and peripheral heating bar 117 providing a flat surface over which extends the outer peripheral portion of facing sheet 3. The heating and bending bar 125 is disposed such that its inner perpendicular face 138 is marginally outside and below the outermost edge of core 2 and is adapted for horizontal reciprocating motion.

It should be noted that peripheral heating bar 117 is separated from sole plate 115 by an air space 121 and from heating and bending bar 125 by another air space 129. In addition, both peripheral heating bar 117 and heating and bending bar 125 are preferably mounted and insulated to preclude a heat conductive path from the bars as will be discussed below. In mounting these heating bars, it is preferred to provide no heat conductive paths from the heating bars to the remainder of the apparatus such that no "cold spots" on the heating bar which can ultimately cause uneven heating of the facing sheet are encountered. In addition, the insulation of peripheral heating bar from the sole plate insures that only the marginal outer portions of the facing sheet extending from the area defined from region 13 and outwardly beyond are heated.

A press bar 200 is located above the heating and bending bars 125. The press bar 200 has a flat bottom surface 201 coextensive with the top surface of the heating and bending bar 125 below the press bar. The press bar 200 is mounted for vertical reciprocating motion and may be powered by an air cylinder (not shown in FIGS. 6–9). Immediately inwardly of press bar 200 is glue line bar 202 which is adapted for vertical reciprocating motion and is adapted at its lowest position to engage and press against the horizontal planar surface 14 on the returning portion of reinforcing strip 5. Glue line bar 202 may also be operated by air cylinders, if desired.

Within glue line bar 202 is a pressure foot 203 also adapted for vertical reciprocating motion. Pressure foot 203 moves downwardly to press the sheet-core assembly against sole plate 115 and thus hold the sheet and core in place.

Below heating and bending bar is slave heater bar 144 which has inner surface 148 conforming to the curve 9 of the core 2. Slave heater bar 144 is coextensive with bending and heating bars and is mounted for reciprocating horizontal motion.

After the core-sheet assembly has been placed on sole plate 115, pressure foot 203 is lowered to securely clamp the sheet-core assembly against sole plate 115 and simultaneously to press the peripheral portions of the sheet against heated peripheral heating bar 117. Press bar 200 is lowered as shown at FIG. 14 to press the marginal portion of sheet 3 against the top surface of bending and heating bar 125. Preferably the under surface of the press bar 200 is provided with a cushion layer 204 such that obtaining equal pressure over the entire edge portion of the sheet is facilitated. During this time, peripheral heating bar 117 heats that marginal area of sheet 3 underlying region 13, outer planar limits of core 2. When the marginal portions of the sheet, including region 13 and all that portion outwardly of region 13, are heated to the temperature necessary for the sheet to become pliable, press bar 200 is lifted to its original elevated position as shown in FIG. 15. Immediately, thereafter, sole plate 115 is lowered, pressure foot 203 continuing to maintain clamping pressure of the core-sheet assembly against the sole plate. During the lowering of the sole plate, edge 124 of bending and heating bar 125 engages the extending marginal portion of the sheet and wipes the same perpendicularly across the curved surface 9 of the peripheral portion of core 2. During this first bending step of the marginal portions of the sheet, sole plate 115 is lowered sufficiently that surface 14 on reinforcing strip 5 is slightly below the bottom surface 123 of the bending and heating bar 125 and such that the formed surface 148 of slave heater bar 144 is opposite curve 9. Bending and heating bar 65 is then operated to move horizontally inwardly across surface 14 wiping the sheet across that surface and slave heater bar 70 moves inwardly pressing sheet 3 against the curve 9 of core 2.

The use of slave heater bars in forming sheets of postforming material around cores having a simple curved edge such as the core illustrated in FIGS. 6–9 is not necessary. The wiping tension of which heating and bending bars 125 impart to the sheet is generally sufficient to make a close, good bond. But slave heater bars having the appropriate pressing surface would be advantageous in forming decorative edges where the edge portion has an S-shaped configuration or the like, as will be discussed below.

During this entire bending operation, the heat in the sheet 2 serves to activate the thermally activatable bonding material 17 which has been deposited on the peripheral portion of the core. Thus, a thermoset bond between the outer portion of the sheet and the peripheral portion of the core is accomplished.

After the inward motion of the bending and heating bar 65 wipes the outermost marginal portion of the sheet across the returning peripheral portion of the core, glue line bar 202 is lowered to press bending and heating bar 125 securely against the returning portion of reinforcing strip 5 as shown in FIG. 16. The residual heat in the marginal portions of the sheet is sufficient to activate the bonding material on the outer portion of the core while the marginal portions of the sheet are held in position against the peripheral edge of the core.

It is pointed out that in instances where a decorative S-shaped outer edge portion is provided on the core, or in instances wherein the facing sheet 2 does not make a complete 180° return around the core, that the apparatus illustrated above can be readily and easily modified to accommodate the structures. In the first instance, slave heater bar 144 beneath heating and bending bar 125 would be supplied on its right-hand edge with a configuration which would conform to the outer configuration of the edge portion of the periphery of the core and would preferably be made independently movable. Then, simultaneously with the upward movement of heating and bending bar 125 as shown in FIG. 15, the slave heater bar would move up opposite the edge of the core and then move inwardly pressing the sheet against the conformation of the core. Subsequently then, the heating and bending bar 125 would move inwardly as shown in FIG. 16 wiping the outermost portion of the sheet around the returning edge of the core. In the second instance, wherein a 180° return is not provided on the core, the undersurface of heating and bending bar 125 could be appropriately angled at that angle corresponding to the angle of return, such that upon its inward motion, it would conform precisely to the configuration of the sheet around the returning portion of the core. Further, if only a drop edge structure is desired, i.e., having an edge without any return, heating and bending bars 125 would not move inwardly but merely would press inwardly on the sheet against the core.

The bending operations of FIGS. 15 and 16 are performed in rapid sequence to first pull the marginal portion of sheet 3 upwardly and around curved surface 9 of the core 2, and then inwardly around the returning surfaces on the underside of the core. Such rapid sequential wiping or pulling tensions the marginal portions of the sheet around the peripheral portion of the core. Since only the marginal edge portions of the sheet outwardly of the region 13 are heated, and since the peripheral portion of the core (except that directly over region 13) is not directly heated, there is very little heat transmitted to the core such that few initial stresses are encountered by virtue of expansion of material. In addition, since only the peripheral portion of the sheet is heated, and consequently only that part expands, as the sheet cools, additional tension forces are created by the sheet alone in the marginal portions of the core, thus, it is postulated, stabilizing the structure.

Since thermosetting bonding material which cures and solidifies rapidly is preferably employed around the outer portion of the core, the core-sheet assembly can be removed from the bending mechanism without waiting for the heated marginal portions to cool completely.

After the sheet has cooled, joiner material may be applied in each of the corners to finish the article or protective strips overlying the corners may be provided.

In the practice of the method described above, sheet 3 was formed from a sheet of 0.050 inch asbestos Micarta. A phenolic cement was coated onto the core on the outer peripheral portion, extending from region 13 around to region 14 about seven days before the sheet-core assembly was made. Prior to the assembly operation, the same cement, which has good contact bonding properties was coated onto the planar portion of the core 16.

Suitable thermosetting material for bonding the periphery of the core is a phenolic resin sold under the trade name "Plyophen-PGL" which cures at a temperature in the range of from 220° to 270° Fahrenheit. When tacky, this material also enables a good contact bond and hence may also be used in region 16. Accordingly, heating and bending bars 65 and heating bars 64 are maintained at about 325° to 350°, and the facing sheet is heated until the sheet reaches a temperature from about 290° to 310° F. Normally, on a 0.050 inch sheet of postforming facing material, the heating operation takes about 45 seconds. On a 0.035 inch sheet, the heating operation would take about 35 seconds.

After heating, the marginal portions were quickly wrapped around the peripheral portion of the core in the manner of FIGS. 15 and 16 to cure the thermosetting bonding material. The marginal portions of the sheet were maintained in the bending device for about 45 seconds to one minute to solidify the bonding material. The sheet-core assembly was then removed from the bending device.

Detail of structure of first apparatus embodiment

Now having set forth the operational aspects of one embodiment of the novel apparatus of this invention, reference may be had to FIGS. 10 through 13 which show the detail of the entire machine schematically illustrated in FIGS. 6–9.

As shown at FIG. 10, heating and bending apparatus 100 includes a frame 101, an upper mechanism 102 suspended from the frame, and a lower mechanism 103 supported on the frame.

Lower mechanism 103 includes sole plate 115 which has a polygonal surface similar to the polygonal surface of the cores to be formed on the machine. As shown in FIG. 11, the apparatus illustrated is designed to produce laminate structures around the rectangular core illustrated in FIGS. 1 through 5. Accordingly, sole plate 115 presents an upwardly facing rectangular surface slightly smaller in extent than the rectangular core to be used. A sheet core assembly is shown in place in the right-hand portion of the illustration at FIG. 11 showing the relationship of core 2 and sheet 3 to the sole plate and the outer heating members.

Immediately outside sole plate 115 and essentially circumscribing the sole plate are peripheral heating bars 117–120 separated from sole plate 115 by an air space 121. Peripheral heater bars 117–120 are adapted to underlie the peripheral planar portions of the core with the outer edge portions of these heating bars being substantially perpendicularly beneath the outermost edge of the core.

Circumscribing the peripheral heating bars 117–120 are elongated heating and bending bars 125–128 and corner heating plates 140–143 to provide a continuous heating surface around the peripheral heating bars 117–120. These heating and bending bars and the corner heating plates are also separated by an air space 129 from peripheral heating bars 117–120.

Support member 115 and peripheral heating bars 117–120 comprise the extent of the support surface over which the core rests during the heating and bending operation. These two members are adapted to be movable vertically downward independently of heating and bending bars 125–128 and the corner heating plates 140–143 as illustrated in FIG. 13.

In FIG. 13, a sectional view is shown, and hence only heating and bending bar 125 and peripheral heating bar 117 are illustrated. Sole plate 115 and peripheral heating bar 117 are supported by an elongated S-shaped angle iron 130 which forms a generally rectangular support frame for sole plate 115. The L-shaped space between angle iron 130 and peripheral heating bar 117 is filled with a rigid, thermally insulating material 132 such that there is no thermally conductive path from heating bar 117 to any other heat absorptive member of the apparatus which might cause a localized heat drain. By virtue of this insulating material and the air space 121 between peripheral heating bar 117 and sole plate 115, the sole plate can remain substantially nonheated, thus insuring that only the peripheral planar portion of the sheet shall be heated. It should be noted that peripheral heating bar 117 is shown to be fastened, in the preferred manner, to insulating material 132 with one screw 133. A different screw 134 is employed to secure the thermally insulating material to angle iron 130. Thus, the screw cannot serve as a heat conductive path from peripheral heating bar 117.

Fixed to the lower surface of angle iron 130 at each corner of sole plate 115 is a mounting plate 135 on which is provided a cylindrical mounting bar 135. Cylindrical mounting bar 136 extends downwardly through bushing 139 so as to be slidable vertically therein. Bushing 139 is affixed to the inner surface of leg 149 which is an L-shaped piece secured to support standard 171. Leg 149 has a first portion 150 parallel with the planar view illustration and the second surface extending inwardly under sole plate 115. A portion of leg 149 is cutaway as at 151 to provide a generally L-shaped vertical surface 152 to mount a rectangular mounting block 153 which is welded to leg 149 at surface 152. Projecting upwardly from mounting block 153 is an ear 154 with an opening to receive pin 155 to pivotally mount the generally T-shaped link 156 of camlike member 157. The upper link 158 of camlike member 157 carries a wheel 159 adapted for rotation about pin 160. Wheel 159 contacts the underside of mounting plate 135. The horizontally projected arm 161 of camlike member 157 is pivotally connected to the piston rod 162 of a pneumatic cylinder 163. Pneumatic cylinder 163 is mounted with piston rod 162 extending generally vertically, the bottom end of cylinder 163 being pivotally connected to a support bar 164 fixed to leg 149. A similar arrangement of bushing 139 and cylinder 163 is provided at each corner beneath sole plate 115.

As shown in FIG. 13, piston rod 162 of cylinder 163 is in its extended position in which wheel 159 engages the bottom surface of mounting plate 139 to maintain the support in an elevated position. When the piston rod 162 is retracted by operating cylinder 163, the camlike member 157 moves to the dotted position of FIG. 13 wherein wheel 159 is in a lower position permitting support 115 and peripheral heating bars 117–120 to correspondingly move to a lower position.

When a different size core is desired to be formed, sole plate 115 and the peripheral heating bars may be lifted entirely out of the apparatus by simply pulling upwardly such that cylindrical bar 136 slides clear of bushing 139. Following that, adjustments in the apparatus may be made and the new sole plate may be inserted to accommodate a different size core. A further discussion of the adjustability of the apparatus will be included below.

Heating and bending bar 125 and slave heating bar 144 are mounted on a sliding block assembly 175 adapted to slide horizontally over plate 176 atop standard 171.

The heating and bending bar and the slave heater bar are both surrounded by insulating material at 177 and 178. An L-shaped bracket 179 extends from heating and bending bar 125 to a notch in the insulation at 180. However, it should be noted that there is no heat conductive path from the heating and bending bar to a large heat sink in the apparatus. Sliding block 181 is disposed around the vertical portion of L-shaped bar 179 and is insulated therefrom, but is adapted to move with the entire sliding block assembly 175.

The heating elements including peripheral heater bars 117–120 and heating and bending bars 125–128 are metal bars having an internal longitudinal recess, such as at 166 on heating and bending bar 125 and 167 on peripheral heating bar 117 in FIG. 13 to receive an electrical heating element.

It should be mentioned that slave heater bar 144 is in good contact with heating and bending bar 125 to assure uniform heating of the slave heater bar and to assure that the heat drain imposed by the slave heater bar is uniform across the entire heating and bending bar 125. In the illustrated embodiment, slave heater bars have no heating elements and draw heat from the heating and bending bars. Heat elements could be provided if desired. The outer edge of sliding block 181 may be moved by piston 184 of air cylinder 185. Upon actuation of the air cylinder, the entire sliding bock assembly 165 is moved to the right as illustrated in FIG. 13. Of course, when the sliding block assembly is moved by the air cylinder, sole plate 115 and peripheral heating bar 117 are in the lowered position, accordingly, when the sliding block assembly moves to the right, heating and bending bar 125 wipes the outermost portion of the sheet across the returning edge of the core and slave heater bar 144 engages the outermost curve of the core pressing the sheet against the core. As mentioned above, slave heater bars are not necessary to form corners such as illustrated in the core in FIG. 13. However, with more intricate corners such as involving an S-shaped outer edge, such slave heater bars become more important. With such cores, it may be desirable to mount the slave heater bars on an entirely different set of air cylinders such that they are independently actuable against the side of the core prior to the wiping operation of the heating and bending bars.

In upper mechanism 102, there are arranged pressure foot 203, glue line bar 202, and pressure bar 200, each arranged outside the other according to a configuration substantially similar to that of the core. A plan arrangement of these three members is shown in FIG. 12. All three members are adapted for reciprocating vertical motion and are movable by means of air cylinders. Innermost of these members is pressure foot 203 which is affixed to air cylinders 210–213. Pressure foot 203 has an outer configuration smaller than but substantially similar to that of the core and is adapted to press downwardly on the underside of the core to maintain pressure on the sheet core assembly against the sole plate. Instead of the rectangular arrangement of bars illustrated in FIGS. 12 and 13, pressure foot can be comprised of a plate or any other member to suitably adapt to exert pressure.

Glue line bar 202 reciprocates vertically in response to air cylinders 215 through 218, and is rigidly attached thereto. The outline of the glue line bar conforms to the outline of the peripheral returning portion of the core inasmuch as the glue line bar, when moved downwardly, engages heating and bending bars 125–128 in their inward position above the returning peripheral portion of the core.

Pressure bar 200 circumscribes the glue line bar and is disposed vertically above heating and bending bars 125–128 and corner plates 140–143, and is provided with a lower surface which is essentially the same in configuration as these members on the lower mechanism. Pressure bar 200 is movable in response to air cylinders 220–223 and is preferably supplied with a cushion 204 on its lower face. This cushion is suitably of silicone rubber or similar resilient material such that when pressure bar 200 is in its lower position against sheet 3, the lower face will be yieldable to facilitate obtaining equal pressure and equal heat transfer to all portions of the sheet. This also aids in insulating the heater bars from the press bar.

Pressure bar 200, glue line bar 202, and pressure foot 203 are all preferably detachably affixed to the air cylinders which actuate them with, for example, bolts as shown at 214, 219, and 224 in FIG. 13. This enables the substitution of various sized bars to accommodate various sized cores in the apparatus.

The entirety of the apparatus is mounted in a boxlike frame, one side of which is illustrated in FIG. 10. Upper I-beam 104 and lower I-beam 105 are connected and spaced in parallel relation by beams 106 and 107 which, for example, may be box beams for strength. The frame then extends with similar members on the opposite side of the apparatus, connected by transverse beams such as at 110–113. Floor 114 is a metal sheet overlying beams 105, 110, and 111 as well as the corresponding beam 105 on the opposite side of the apparatus. Floor 114 may be affixed to the beams by welding or the like.

Referring now specifically to FIG. 12, there is shown a view along line 12—12 showing the adjustable support structure for upper mechanism 102. Upper I-beams 104 and 104a are provided with guide plates 250–253 at substantially the upper corners of the apparatus. These guide plates are provided with cylindrical holes such as at 255 to accommodate transverse, cylindrical guide members 256–259. In addition, movable guide members 260 and 261 are suspended from I-beams 104 and 104a and are adapted to roll along the flange of the I-beams 104 and 104a and are adapted to roll along the flange of the I-beams by means of rollers 262–265. Movable guides 260 and 261 also accommodate two tranverse, cylindrical guide members 267 and 268. These transverse guide members are all arranged in the same horizontal plane.

Mounted on the transverse guide members 256–259 and 267–268 are support standards 271–276. Specifically, support standards 271–274 serve to support the air cylinders of the press bar, the glue line bar, and the pressure foot, and accordingly, are arranged above the corners of the core. Support standards 275 and 276 ride transverse cylindrical guides 258 and 259 and render the entire apparatus adjustable.

Support standards 271–276 are also provided with holes to slide along lengthwise guide members 280–283 which are also arranged in one plane below the transverse cylindrical guide. Accordingly the floor support standards 271–274 may be rendered by this arrangement adjustable to substantially any size core limited only by the overall size of the apparatus.

Support standards such as those illustrated at 171 and 172 in the lower mechanism 103 operate on a similar cylindrical guide system. Referring specifically to FIG. 10, it may be seen that support standards 171 and 172 are movable along cylindrical guides 162–165, while transverse cylindrical guides 166 and 167 guide support standard 173. Furthermore, it may be seen that lengthwise cylindrical guide 190 extends through the support standards in the manner of the lengthwise cylindrical guides in the upper mechanism. It should be noted that in the lower mechanism, the support standards 171–173 are provided with spherical rollers such as at 195 which rests on floor 114. Thus, the entire weight of the lower apparatus is not made to rest solely on the cylindrical guide members.

Structure and operation of second apparatus embodiment

Figure 18:
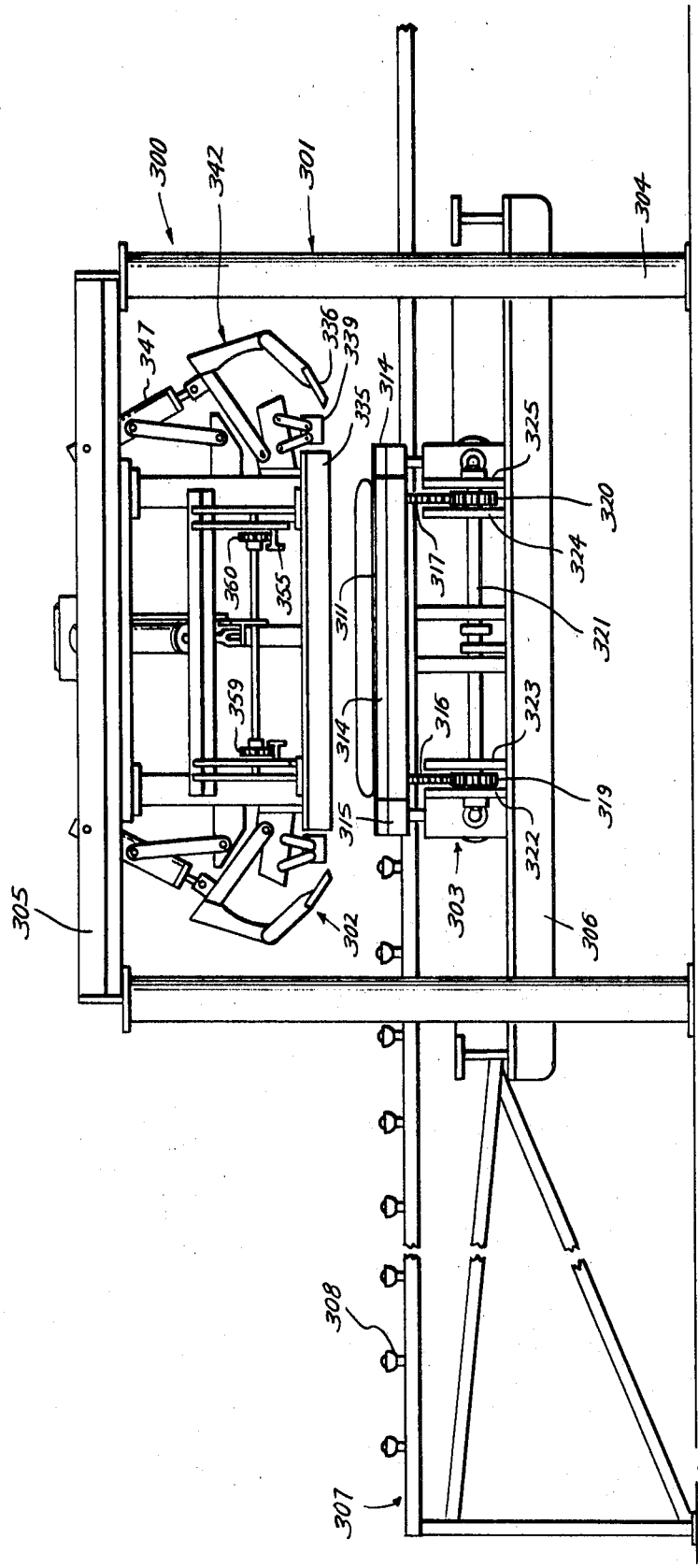
FIG. 18 is a front elevational view of the apparatus illustrated schematically in FIGS. 13 through 16.

As shown at FIG. 18 and in operation in FIGS. 14–17, the second embodiment of apparatus 300 includes a frame 301 on which is mounted an upper mechanism 302 and a lower mechanism 303. Frame 301 includes four longitudinally and transversely spaced apart columns 304, an upper bed 305 secured adjacent the upper ends of columns 304 and a lower bed 306 secured to the columns and extending horizontally at a location spaced above the lower ends of columns 304.

A feed table 307 extends longitudinally of apparatus 300, the feed table including a plurality of ball casters 308 which provide for supporting a sheet-core assembly 22 thereon for movement of the completed sheet-core assembly 22 thereon for movement of the completed sheet-core assembly out of position in the apparatus.

Apparatus 300 forms a polygonal laminated product. Apparatus 300 is, however, specifically arranged to form a rectangular product like the laminated panel of FIGS. 1–5.

With reference to FIG. 18, lower mechanism 303 of apparatus 300 includes a sole plate 313 which presents a rectangular upwardly facing surface 311. Support 310 includes four peripheral heating bars 312 to underlie the peripheral planar portions of the core and to form with sole plate 313 suport surface 310. The arrangement of peripheral heating bars 312 is substantially the same as the arrangement of heating bars 117–120 in apparatus 100. However, in apparatus 300 as shown at FIG. 18, sole plate 313 and peripheral heating bars 312 are fixed to lower bed 306 against movement.

Four heating-bending bars 314 extend around the peripheral heating bars and are parallel thereto. Each heating-bending member 314 is secured to a block of heat insulating material 315 on which member 314 is mounted. Each heat insulating block 315 extends the length of the heating-bending member 314 which is mounted on the insulating block. Each insulating block is mounted on a pair of vertically downwardly extending racks 316 and 317, each rack having a set of gear teeth formed along the outwardly facing edge thereof. Gears 319 and 320, fixed to a shaft 321, mesh with the gear teeth of racks 316 and 317, respectively, so as to enable raising of the heating and bending bars 314 relative to sole plate 313.

Upper mechanism 302 includes a clamp plate or pressure foot 335 which is movable vertically from the position of FIG. 14 to the position of FIG. 15 in engagement with bottom surface 234 of core panel 12. Clamp plate 335 is generally rectangular and is dimensioned to fit into the recess between inner edges 113 of the core. Clamp plate 335 is mounted on vertically upwardly extending air cylinders (not shown) fixed to upper bed 305.

Upper mechanism 302 also includes four holding bars 336. Holding bars 336 are each movable from the position shown in FIG. 14, wherein the holding bars are outwardly of heating-bending members 314 to the position of FIG. 15 wherein flat bottom surfaces of the holding bars engage marginal portions 17 of the facing sheet to hold the sheet against top surfaces 338 of heating-bending members 314.

Upper mechanism 302 also includes four bending bars 339 which are mounted to move along a straight line in a downward and inward path relative to core assembly 22 so that flat bottom surfaces 340 of the holding bars wipe the marginal portions 17 of the facing sheet across surface 20 of the core after heating and bending bars 314 have bent the sheet upwardly.

Each holding bar 336 is mounted on lower part of a generally U-shaped structure 342. The upper portion of U-shaped structure 342 is pivotally connected to upper bed 305. Piston rod 351 of a pneumatic cylinder 347 is pivotally connected to the upper part of U-shaped arm 342. Cylinder 347 is mounted with its axis extending outwardly and downwardly.

With cylinder 347 in its retracted condition, holding bar 336 is in the position shown in solid lines at FIG. 14. When pneumatic cylinder 347 is extended, holding bar 336 is moved to the position of FIG. 15.

Bending bar 339 is connected to a pair of racks 355, located one adjacent each end of each bending bar 339. Racks 355 are each mounted on slide surfaces 358 which guide and support racks 355 for movement inwardly and downwardly at an angle of approximately 11° relative to surface 311 of support 310.

Gears 359 and 360 are fixed to a shaft 361 which extends horizontally across upper mechanism 302. Means are provided to rotate gears 359 and 360 in place, thus causing racks 355 to be driven down guide surfaces 358 and across the returning peripheral portion of the core. For example, air cylinders, not shown, upon actuation may be made to push outwardly on an arm affixed to gears 359 and 360 to rotate the gears and move the racks. The racks 355 for each bending bar 339 are provided with upwardly facing gear teeth which mesh with the teeth of gears 359 and 360. A similar arrangement may be used to have gears 319 and 320 drive racks 316 and 317.

FIG. 13 shows a sheet-core assembly 22 in position on surface 311 of support 310. Marginal portions 17 of facing sheet 2 project outwardly from the sides of core 3 to extend over top surface 338 of heating-bending member 314. Clamp plate 335 is elevated from core 3 and bending bar 339 and holding bar 336 are each elevated above surface 311 of support 310. First, electric heating elements such as 368 in heating-bending member 314 and in heating members 312, respectively, are energized to heat top surface 338 and top surface 370 of heating bar 312. Then, clamp plate 335 is lowered to press sheet-core assembly 22 against support surface 311 of support 310. Simultaneously, pneumatic cylinder 347 is extended to move holding bar 336 to the position of FIG. 14 wherein, bottom surface 337 of the holding bar engages marginal portion 17 of the sheet to press same against surface 338 of heating-bending member 314.

After marginal portion 17 of the sheet is heated to the desired softening temperature, heating-bending member 314 is elevated to the position of FIG. 15 and thus wipe marginal portion 17 of the sheet around the first 90° bend of the edge of core 3. In quick sequence, bending bar 339 moves inwardly across surface 20 of core 3 and simultaneously wipes marginal portions 17 of the sheet across the second 90° bend of the edge of core 3 and the surface 20. Bending bar 339 is held in position against the side of the core thus clamping the sheet tightly to the core for a sufficient time, about 1 minute, while thermosetting adhesive 21 cures. The apparatus is then returned to the position of FIG. 13 to permit removal of the laminated product formed, from the apparatus. Tensioning of marginal portion 17 of the sheet is effected by heating and bending bar 314 and by bending bar 339 during the wiping operations.

Comparison of apparatus 300 of FIG. 12 with apparatus 100 above shows that these apparatuses are quite similar in that the sole plate 115 is like sole plate 313 and heating-bending bars 125–128 are similar to heating-bending bars 314. However, in apparatus 100, sole plate 115 is lowered and heating-bending bars 36–39 remain stationary during the first bending operation, whereas in apparatus 300 heating-bending bars are moved vertically and support 310 remains stationary. In addition, heating-bending members 125–128 are moved inwardly across the core of apparatus 25, whereas separate bending members 339 are included in apparatus 300.

Although there are these differences between apparatus 300 and apparatus 100, the sequence of steps involved in wiping the marginal portions of the facing sheet around the edges of the core are substantially similar.

While first and second preferred embodiments of the apparatus for forming a laminated polygonal product have been shown and described in detail, including the method of forming the polygonal product, it is to be understood that variations can be made in the embodiments of apparatus and the method without departing from the scope of this invention as defined in the appended claims.

What is claimed is:

1. A method for producing laminate structures comprising
    registering a planar polygonal core having rounded returning peripheral edge portions with a postforming facing sheet sized to cover one planar face and extend beyond and around the peripheral portions of said core,
    bonding said sheet to the planar portion of said core in registered position,
    heating only the peripheral portions of said sheet, which overlie the marginal planar portion of said core and extend beyond said core, sufficiently to make said portions of said sheet formable,
    insulating the remaining portions of said sheet in contact with the planar portion of said core inwardly of said peripheral portions from such heating,
    postforming all the heated peripheral portions of said sheet simultaneously over and inwardly around the peripheral portions of said core,
    bonding said peripheral portions of said sheet to said core with a heat activated adhesive.

2. The process of claim 1 wherein said sheet is bonded to the planar portion of said core with a contact adhesive.

3. The process of claim 1 wherein the peripheral portions of said sheet are thermally bonded to said core with a thermosetting adhesive.

4. The process of claim 1 wherein said peripheral portions of said sheet are heated by uniformly pressing said sheet against a uniformly heated surface.

5. The process of claim 4 wherein the finished side of said sheet is pressed down against said heated surface.

6. The process of claim 1 wherein said postforming sheet is comprised of laminae of porous material impregnated with a thermosetting resin.

7. The process of claim 1 wherein the postforming is effected by wiping the peripheral portions of the sheet around the core under tension while continuing application of heat to said peripheral portions of said sheet.

8. A process for producing a laminate structure which comprises
    applying an adhesive to the planar portions and the peripheral portions of a planar polygonal core having rounded returning peripheral portions,
    registering said core with a postforming facing sheet sized to cover one planar face and extend beyond and around the peripheral portions of said core, the portions of said sheet overlying the vertices of said core being configured to produce corners conforming to said core when around said core,
    pressure bonding the planar portion of said core carrying said contact adhesive to said sheet,
    heating the peripheral portions of said sheet, which overlie the marginal planar portion of said core and extend beyond said core, sufficiently to make said portions of said sheet formable,
    insulating the remaining portion of said sheet in contact with the planar portion of said core inwardly of said peripheral portions from such heating,
    simultaneously postforming the heated peripheral portions of said sheet over and inwardly around the peripheral portions of said core, with continued application of heat to said peripheral portions of said sheet,
    pressing said postformed portions of said sheet against the peripheral and returning portions of said core to bond said sheet to the peripheral portions of said core.

9. The process of claim 8 wherein said heat activatable material is a thermosetting resin which produces a thermoset bond between said postforming sheet and the marginal planar portions and the peripheral portions of said core.

10. The process of claim 9 wherein said thermosetting resin is a phenolic resin.

11. The process of claim 8 wherein said postforming sheet is comprised of laminae of paper impregnated with a thermosetting resin.

12. The process of claim 8 wherein the pressure between said sheet and said core to obtain said contact bond is maintained throughout the steps of heating, and postforming and binding the peripheral portions of said sheet.

13. The process of claim 8 wherein said heating is effected by uniformly pressing said sheet against a uniformly heated surface.

14. The process of claim 13 wherein the finished side of said sheet is pressed against said heated surface.

References Cited
UNITED STATES PATENTS

| | | | |
|---|---|---|---|
| 2,890,919 | 6/1959 | Hansen | 156—216X |
| 2,937,689 | 5/1960 | Peterson | 156—216X |
| 3,296,052 | 1/1967 | Bechtold | 156—212X |
| 3,382,124 | 5/1968 | Briskey | 156—212X |
| 3,392,074 | 7/1968 | Bartron | 156—223X |
| 3,147,172 | 9/1964 | Wesa et al. | 156—216X |

SAMUEL W. ENGLE, Primary Examiner

U.S. Cl. X.R.

156—479